United States Patent
Wernersson

(10) Patent No.: US 6,674,267 B2
(45) Date of Patent: Jan. 6, 2004

(54) METHOD AND A DEVICE FOR COMPENSATION OF THE CONSUMPTION OF REACTIVE POWER BY AN INDUSTRIAL LOAD

(75) Inventor: Lennart Wernersson, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/032,557

(22) Filed: Jan. 2, 2002

(65) Prior Publication Data

US 2003/0098672 A1 May 29, 2003

(30) Foreign Application Priority Data

Nov. 28, 2001 (SE) .............................. 0103985

(51) Int. Cl.$^7$ .............................. G05F 1/70
(52) U.S. Cl. ....................... 323/210; 323/207
(58) Field of Search ................ 323/210, 208, 323/211, 209, 207, 218, 205; 363/41, 79, 39

(56) References Cited

U.S. PATENT DOCUMENTS

| | | | | |
|---|---|---|---|---|
| 4,451,777 A | * | 5/1984 | Gyugyi | 323/210 |
| 5,227,713 A | * | 7/1993 | Bowler et al. | 323/210 |
| 5,586,018 A | * | 12/1996 | Aoyama et al. | 363/41 |
| 6,114,841 A | * | 9/2000 | Hasler et al. | 323/210 |

FOREIGN PATENT DOCUMENTS

| | | |
|---|---|---|
| EP | 0 260 504 B1 | 3/1988 |
| EP | 0 847 612 B1 | 6/1998 |

* cited by examiner

*Primary Examiner*—Rajnikant B. Patel
(74) *Attorney, Agent, or Firm*—Oblon, Spivak, McClelland, Maier & Neustadt, P.C.

(57) ABSTRACT

An industrial load, preferably an electric arc furnace or a plant for rolling of metallic materials, is supplied from a three-phase electric ac network. A device for compensation of the reactive power consumption of the load comprises a first compensation device for controllable consumption of reactive power and a second compensation device for generation of reactive power, both connected to the electric power network in a parallel connection with the load. The first compensation device comprises a thyristor-controlled reactor for each of the phases of the ac network. Control equipment is supplied with measured values of sensed amplitude values for voltages and currents. The control equipment comprises means for forming a voltage mean value as the mean value of the sensed amplitude values of voltage, and means for forming, for each of the thyristor-controlled reactors, an amplitude deviation as a difference of the voltage mean value and the amplitude value associated with the thyristor-controlled reactor, and means for forming, for each of the thyristor-controlled reactors, a separate control order in dependence on the amplitude deviation for the respective thyristor-controlled reactor.

22 Claims, 4 Drawing Sheets

METHOD AND A DEVICE FOR COMPENSATION OF THE CONSUMPTION OF REACTIVE POWER BY AN INDUSTRIAL LOAD

TECHNICAL FIELD

The present invention relates to a method for compensation of the reactive power consumption of an industrial load, preferably an electric arc furnace or a plant for rolling of metallic material, supplied from a three-phase electric ac network, wherein a first compensation device for controllable consumption of reactive power, comprising a thyristor-controlled reactor for each of the phases of the ac network, and a second compensation device for generation of reactive power are both connected to the electric power network in a parallel connection with the load, and a device for carrying out the method.

The device comprises means for determining the instantaneous consumption of reactive power by the load, and a control device, which, in dependence thereon, forms a control order for the thyristor-controlled reactors and supplies the control order thereto.

BACKGROUND ART

Industrial loads connected to electric ac networks, in particular arc furnaces but also, for example, rolling mills, influence the voltage of the ac network, above all by a greatly varying consumption of reactive power during operation. Especially when the variations in power consumption lie within a frequency interval of typically 0–20 Hz, the corresponding voltage variations, so-called flicker, are observable and disturbing to the human eye in case of electric lighting supplied by the ac network.

It is known, in connection with industrial loads of the above-mentioned kind, to connect in parallel therewith, that is, in a shunt connection to the ac network, static compensators for compensation of the reactive power consumption of the load. One type of such compensators usually comprises a device for generating reactive power as well as a device for controllable consumption of reactive power, known within the art as a thyristor-controlled reactor (TCR). The device for generation of reactive power usually comprises one or more mutually parallel-connected filters, each one essentially comprising an inductive element in series-connection with capacitive elements. The filters are tuned to chosen multiples of the nominal frequency of the ac network, for example to the 3rd, 4th and 5th tones, sometimes even to the 2nd and 7th tones. The device for controllable consumption of reactive power comprises an inductive element, a reactor, in series-connection with a controllable semiconductor valve. The controllable semiconductor valve comprises two controllable semiconductors, usually thyristors, in anti-parallel connection. By phase-angle control of the semiconductors, that is, by controlling their turn-on angle relative to the phase position of the voltage of the ac network, the susceptance of the device and hence its consumption of reactive power can be controlled.

For a general description of thyristor-controlled reactors, reference is made to Åke Ekström: High Power Electronics HVDC and SVC, Stockholm June 1990, in particular to pages 1–32 to 1–33 and 10–8 to 10–12.

The compensator generates a reactive power equal to that generated by the device for generation of reactive power, reduced by the consumption in the thyristor-controlled reactor. By determining the instantaneous consumption of reactive power by the load and then controlling the power consumption of the thyristor-controlled reactor to such a value that, together with the consumption of the load, it corresponds to the reactive power generated by the device for generation of reactive power, the reactive power exchange with the ac network becomes zero.

European patent specification EP 0 260 504 describes a circuit for compensation of reactive power comprising a compensator and a load of the above-mentioned kind. In addition thereto, this circuit comprises a self-commutated converter, controlled in pulse-width modulation in dependence on control signals generated in a control member, and connected to the ac network in parallel connection with the load and the thyristor-controlled reactor. The converter supplies to the ac network a reactive current for compensation of the active and reactive power consumed/generated by the load and the thyristor-controlled reactor. In an orthogonal two-phase system, in dependence on sensed three-phase currents and three-phase voltages, the control member calculates instantaneous values of the active and reactive power consumed/generated by the load and the thyristor-controlled reactor together.

In the above-mentioned patent specification, it is stated that the voltage variations in the ac network are substantially determined by variations in the reactive power consumption of the load and that voltage dependence on its active power consumption may be neglected. The control signals to the converter are therefore formed only in dependence on variations in the consumption of reactive power by the load.

The method used in the patent specification EP 0 260 504 for determining the instantaneous active and reactive power of the load in an orthogonal two-phase system is also applicable for control of a thyristor-controlled reactor. However, it has proved to be difficult and in certain cases impossible, with the method for forming a control signal as stated in the above-mentioned patent specification, to meet the increasingly more stringent demands on allowable disturbances imposed by the operators of the ac networks.

European patent specification EP 0 847 612 describes a device for compensation of reactive power in an industrial load of the above-mentioned kind. The device comprises a first compensation device in the form of a thyristor-controlled reactor for controllable consumption of reactive power and a second compensation device for generating reactive power by means of capacitive elements. A control member calculates in an orthogonal two-phase system, via sensed three-phase currents and three-phase voltages, instantaneous values of the consumption of reactive and active power by the load. The control member comprises a signal-processing member with a phase-advancing characteristic within the frequency range of interest to flicker, which signal-processing signal is supplied with a signal corresponding to the mentioned consumption of active power. A control order for the first compensation device is formed in dependence on the consumption of the reactive power by the load as well as on an output signal from the signal-processing member.

It is desirable, among other things because of the expenses, to be able to utilize thyristor-controlled reactors for compensation of reactive power in the applications mentioned in the introductory part of the description, but it has been established that there is a need for further improvements of their ability to rapidly compensate for variations in the power consumption of the load.

SUMMARY OF THE INVENTION

The object of the invention is to provide a method of the kind stated in the introductory part of the description, by which the reduction of so-called flicker is improved, and a device for carrying out the method.

According to the invention, this is achieved by sensing, for each one of the phases of the ac network, an instantaneous amplitude value of a voltage which represents the voltage across the thyristor-controlled reactor for the respective phase, by forming a voltage mean value from said amplitude values, by forming, for each of the phases of the ac network, an amplitude deviation as a difference of said voltage mean value and said respective instantaneous amplitude value, and by forming a separate control order for each one of the thyristor-controlled reactors in dependence on the amplitude deviation for the respective thyristor-controlled reactor.

Advantageous further developments of the invention will become clear from the following description and claims.

By means of the invention, the following advantages, among other things, are obtained in relation to the prior art. To obtain a measure of the consumption of reactive power in accordance with the prior art, it is required that sensed measured values of currents and voltages obtained on two separate measurement occasions are supplied to the control equipment. By forming the control order in dependence also on the above-mentioned amplitude deviation in voltage, according to the invention, an influence on the susceptance of the thyristor-controlled reactor may be obtained without waiting for the effect of the voltage change on the reactive power consumption determined in the manner previously known. In addition thereto, it is characteristic of industrial loads of the mentioned kind, and in particular in the case of electric arc furnaces, that variations in power consumption exhibit a considerable phase unbalance. By therefore forming a separate control order for each of the thyristor-controlled reactors belonging to the respective phase, also according to the invention, the effect on the ac network may be further reduced.

BRIEF DESCRIPTION OF THE DRAWINGS

The invention will be described in greater detail by description of embodiments with reference to the accompanying drawings, wherein FIG. 1A schematically shows, as a single-line diagram, an ac network with an industrial load and, in the form of a block diagram, a piece of control equipment according to one embodiment of the invention for compensation of the reactive power consumption of the load, FIG. 1B schematically shows, as a single-line diagram, an ac network with an industrial load and, in the form of a block diagram, a piece of control equipment according to an additional embodiment of the invention for compensation of the reactive power consumption of the load.

DESCRIPTION OF THE PREFERRED EMBODIMENTS

The following description relates both to the method and the device. The device comprises calculating members, shown in the figures as block diagrams. The block diagrams may be understood both as a signal-flow diagram and as a block diagram describing a piece of control equipment for the device. A function carried out by a block shown in the block diagram may, in applicable parts, be implemented by means of analog and/or digital technique, but is advantageously carried out as a program in a microprocessor. It is to be understood that when the blocks shown in the figure are referred to in a physical embodiment as a diaphragm, a filter, an apparatus, etc., they are to be understood as means for achieving a desired function, especially when the function is implemented as software in a microprocessor. Consequently, as it may be in this case, the expression "signal" may also be interpreted as a value generated by a computer program and may also appear in this form only. The blocks mentioned below are only given a functional description since these functions, in a manner known per se, may be implemented by a person skilled in the art.

In order not to burden the presentation with distinctions self-explanatory to the man skilled in the art, generally the same designations are used for the quantities which arise in the compensation device and the load as for the measured values and signals/calculated values, corresponding to the above-mentioned quantities, which are supplied to and processed in the control device described in the following. When in the following description, a described quantity or a described member is representative of each one of the respective phases, the quantity or the member is denoted by a suffix xy, where xy stands for ab, bc and ca, respectively.

Figure 1A:
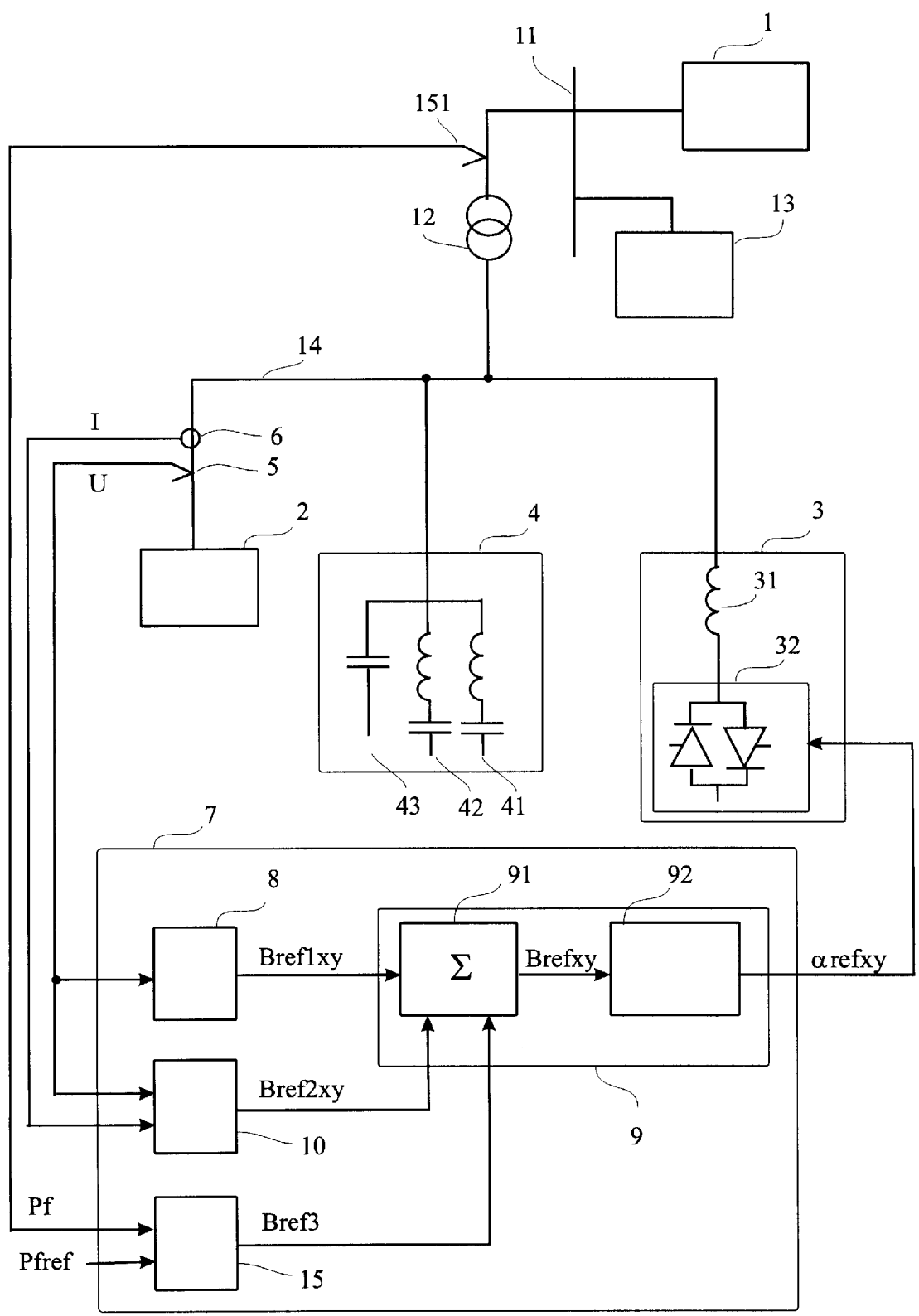

FIG. 1A shows, as a single-line diagram, a three-phase electric ac network 1 with a busbar 11. An industrial load 2 in the form of an electric arc furnace is connected to the busbar 11 via a transformer 12. In parallel with the arc furnace, at a busbar 14, a first compensation device 3 for controllable consumption of reactive power and a second compensation device 4 for generation of reactive power are connected. Further, a general load 13 is also connected to the busbar 11, which load may, for example, comprise lighting networks in dwellings or offices.

The first compensation device comprises, for each of the three phases of the ac network, a thyristor-controlled reactor, in the figure shown as a reactor 31 and a controllable semiconductor connection 32 connected in series therewith, comprising two thyristors in anti-parallel connection. The susceptance of the compensation device, and hence its consumption of reactive power, are controllable in a manner known per se by phase-angle control of the thyristors, that is, by control of their turn-on angle relative to the phase position for the voltage of the ac network.

The second compensation device comprises a number of mutually parallel-connected filters, each one being tuned, in a manner known per se, to resonance with a certain multiple, tone, of the nominal frequency of the ac network, for example its 3rd, 4th or 5th tone. For the sake of clarity, the figure only shows two filters 41 and 42, but it is to be understood that the second compensation device may comprise one or more filters of this type. Each one of the filters essentially comprises an inductive element in series-connection with a capacitive element and this capacitive element generates a certain reactive power. The arc furnace and the compensation device are dimensioned in such a way, with respect to reactive power, that the second compensation device generates a power which, at least during normal operation, exceeds the reactive power consumption of the arc furnace, and the first compensation device is controlled to consume a power such that, together with the consumption of the load, it corresponds to the reactive power generated by the second compensation device. Viewed towards the transformer 12, the reactive power consumption on the busbar 14 is then equal to zero. The second compensation device may also comprise a capacitor bank 43 in the event that the generation in the filters should be insufficient.

The thyristor-controlled reactors comprised in the first compensation device are usually mutually connected in Δ-connection. For this reason, voltages on the busbar 14 are denoted as principal voltages in the following description. With the three phases of the ac network designated a, b and c, the amplitude values of these voltages, preferably their rms values, for the three phases on the busbar 14 are designated $U_{ab}$, $U_{bc}$, $U_{ca}$, respectively. These voltages, which also represent the voltage across the respective thyristor-controlled reactor, are sensed in some manner known per se by means of a voltage-measuring device 5. The currents which flow to the load 2 are designated $I_a$, $I_b$, $I_c$, respectively, and are sensed in some manner known per se by means of a current-measuring device 6. The sensed values of currents and voltages are supplied as measured values to a piece of control equipment 7, which, in dependence thereon, form a control order αrefxy, which is supplied to the semiconductor connection 32.

The control of the first compensation device is performed, as mentioned above, by controlling its susceptance, here designated B. If the turn-on angle α of the thyristors is defined relative to the phase position of the zero crossing of the ac voltage across the reactor, a susceptance with a maximum magnitude (with a negative sign) is obtained, and hence a maximum current through the reactor is obtained, for α=90°, and a minimum susceptance (that is, equal to zero) is obtained for α=180°. The susceptance value with a maximum magnitude thus amounts to B=−1/πωL, where L denotes the inductance of the reactor and ω is the angular frequency of the ac network.

Between susceptance B and turn-on angle α the following well-known relationship prevails $$B(\alpha) = -[2(\pi-\alpha) + \sin 2\alpha]/\pi\omega L \qquad (1)$$

It is to be understood that a piece of control equipment 7 is associated with each of the three phases in the ac network and that the following description is representative of each one of the respective phases.

The control equipment 7 comprises, in a manner known per se, a first calculating member 8, a second calculating member 10, a controller 15, and a control member 9 which comprises a summing member 91 and a function-forming member 92.

The summing member 91 forms a susceptance reference Brefxy of a first reference value Bref1xy, a second reference value Bref2y and a third reference value Bref3.

The function-forming member 92 is supplied with the susceptance reference Brefxy and forms the control order αrefxy based on the expression (1). The first compensation device is controlled with the aid of the control order αrefxy to a reactive power consumption, which together with the consumption of the arc furnace balances the power generated by the second compensation device.

Figure 2:
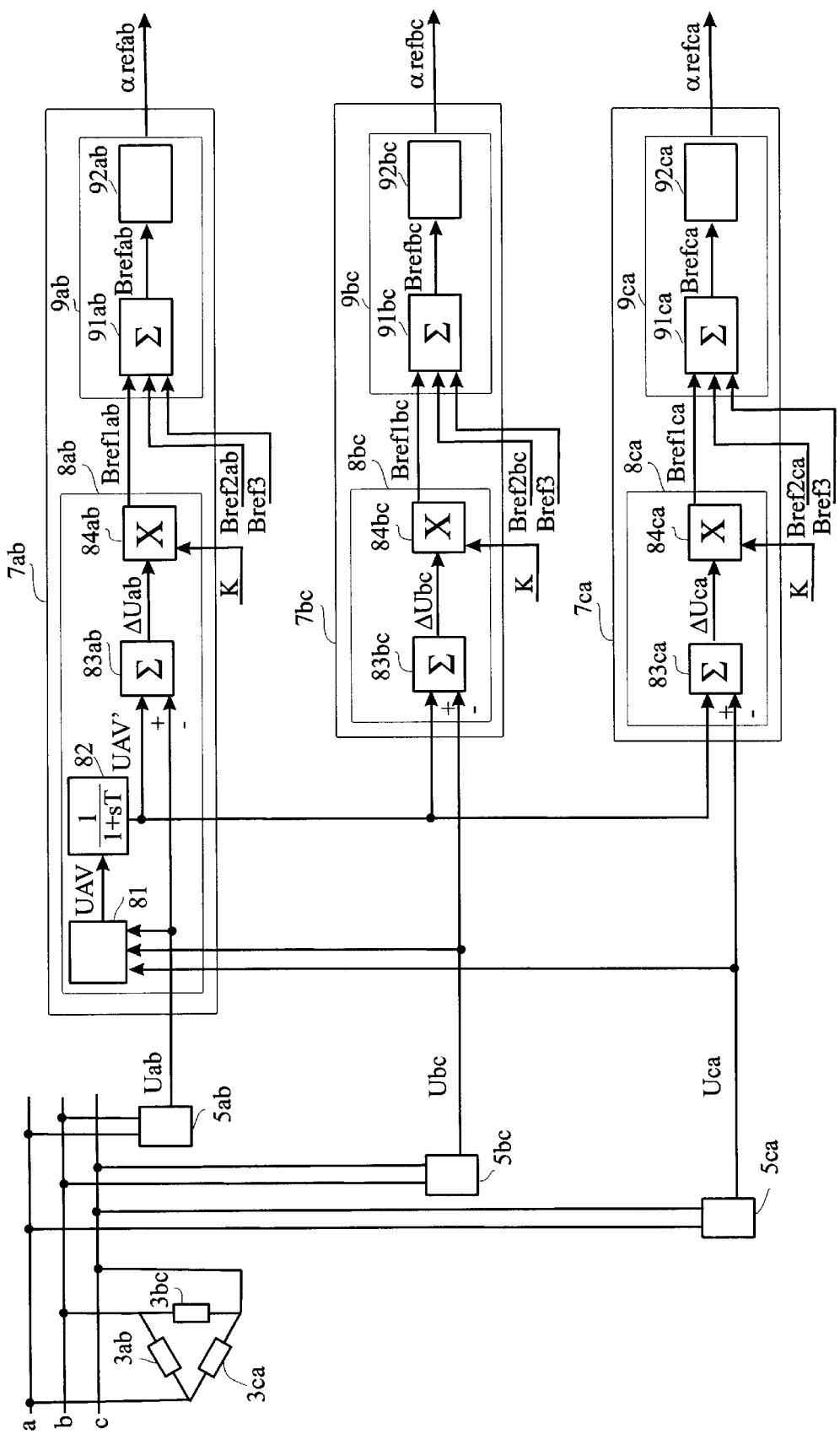
FIG. 2 shows an embodiment of a piece of control equipment according to FIGS. 1A and 1B.

FIG. 2 shows a preferred embodiment of the invention. The first compensation device comprises a thyristor-controlled reactor 3*ab*, 3*bc*, 3*ca* for each one of the three phases of the ac network. The thyristor-controlled reactors are connected in a Δ-connection.

A piece of control equipment 7*ab* is associated with the thyristor-controlled reactor 3*ab* in order to form a control order αrefab therefor in a manner which will be described in more detail below. The control equipment 7*ab* comprises a calculating member 8*ab* which, in dependence on values supplied thereto, forms a reference value Bref1*ab* for the susceptance reference, and a control member 9*ab* which, in dependence thereon, forms the control order αrefab.

The calculating member 8*ab* comprises a mean-value forming member 81, a filter member 82 with a low-pass characteristic, a difference-forming member 83*ab*, and a multiplying member 84*ab*. The filter member 82 may, for example, as illustrated in the figure, be designed with a simple time constant, typically of the order of magnitude of 1 second.

According to this embodiment of the invention, the first reference value Bref1*ab* for the susceptance is formed as follows.

The above-mentioned amplitude values $U_{ab}$, $U_{bc}$, $U_{ca}$ of the voltage of the load are sensed continuously in some manner known per se by means of the voltage-measuring devices 5*ab*, 5*bc*, 5*ca*, respectively. The amplitude values $U_{ab}$, $U_{bc}$, $U_{ca}$ are supplied to the mean-value forming member 81, which, in dependence thereon, forms a calculated voltage mean value $U_{AV}$ as the mean value of the amplitude mean values supplied thereto. The output signal $U_{AV}$ from the member 81 is supplied to the filter member 82, which as output signal forms a filtered voltage mean value $U_{AV}'$.

The difference-forming member 83*ab* is supplied with the filtered voltage mean value $U_{AV}'$ and the amplitude value $U_{ab}$, and forms as output signal a difference $\Delta U_{ab}$ of the voltage values supplied thereto, which difference constitutes an amplitude deviation between the voltage mean value and the amplitude value.

The amplitude deviation and an amplification factor K are supplied to the multiplying member 84*ab*, which, as output signal, forms the first reference value Bref1*ab* as the product of the values of the amplitude deviation and of the amplification factor supplied thereto.

The first reference value Bref1*ab* is supplied, together with the second reference value Bref2*ab* and the third reference value Bref3*ab*, to a summing member 91*ab* comprised in the control member 9*ab*, which summing member 91*ab*, as output signal, forms a susceptance reference Brefab for the thyristor-controlled reactor 3*ab* as the sum of the reference values supplied thereto. A function-forming member 92*ab* comprised in the control member 9*ab* is supplied with the susceptance reference and forms, in dependence thereon, the control order αrefab for the thyristor-controlled reactor 3*ab* based on the expression (1) above.

In a corresponding manner, the pieces of control equipment 7*bc* and 7*ca* are associated with the thyristor-controlled reactors 3*bc* and 3*ca*, respectively. These pieces of control equipment are of the same kind as the control equipment 7*ab* and thus comprise calculating members 8*bc* and 8*ca*, respectively, as well as control members 9*bc* and 9*ca*, respectively, which form control orders αrefbc and αrefca for the respective thyristor-controlled reactor.

The above description relating to the control equipment 7*ab* is thus valid also for the pieces of control equipment 7*bc* and 7*ca*, if, for signals and members with suffixes, the suffix ab is replaced by the suffix bc and the suffix ca, respectively. However, in this embodiment of the invention, the pieces of control equipment 7*bc* and 7*ca* do not comprise any mean-value forming member or any filter member corresponding to the mean-value forming member 81 and the filter member 82 described above. As illustrated in the figure, the filtered voltage mean value $U_{AV}'$ from the filter member 82 is supplied to the difference-forming members 83*bc* and 83*ca*, respectively.

The value of the constant K, which is common to all the three pieces of control equipment 7*ab*, 7*bc*, 7*ca*, is chosen in dependence on known data for the short-circuit power $S_{SC}$ of the ac network at the connection point of the load in the network and on the rated power $Q_{TCR}$ for the first compensation device. It may be shown that the theoretically optimal value of K is given by the relationship $K=S_{SC}/Q_{TCR}$; however, in practice a lower value is advantageously chosen in order to ensure stable operation.

Figure 1B:
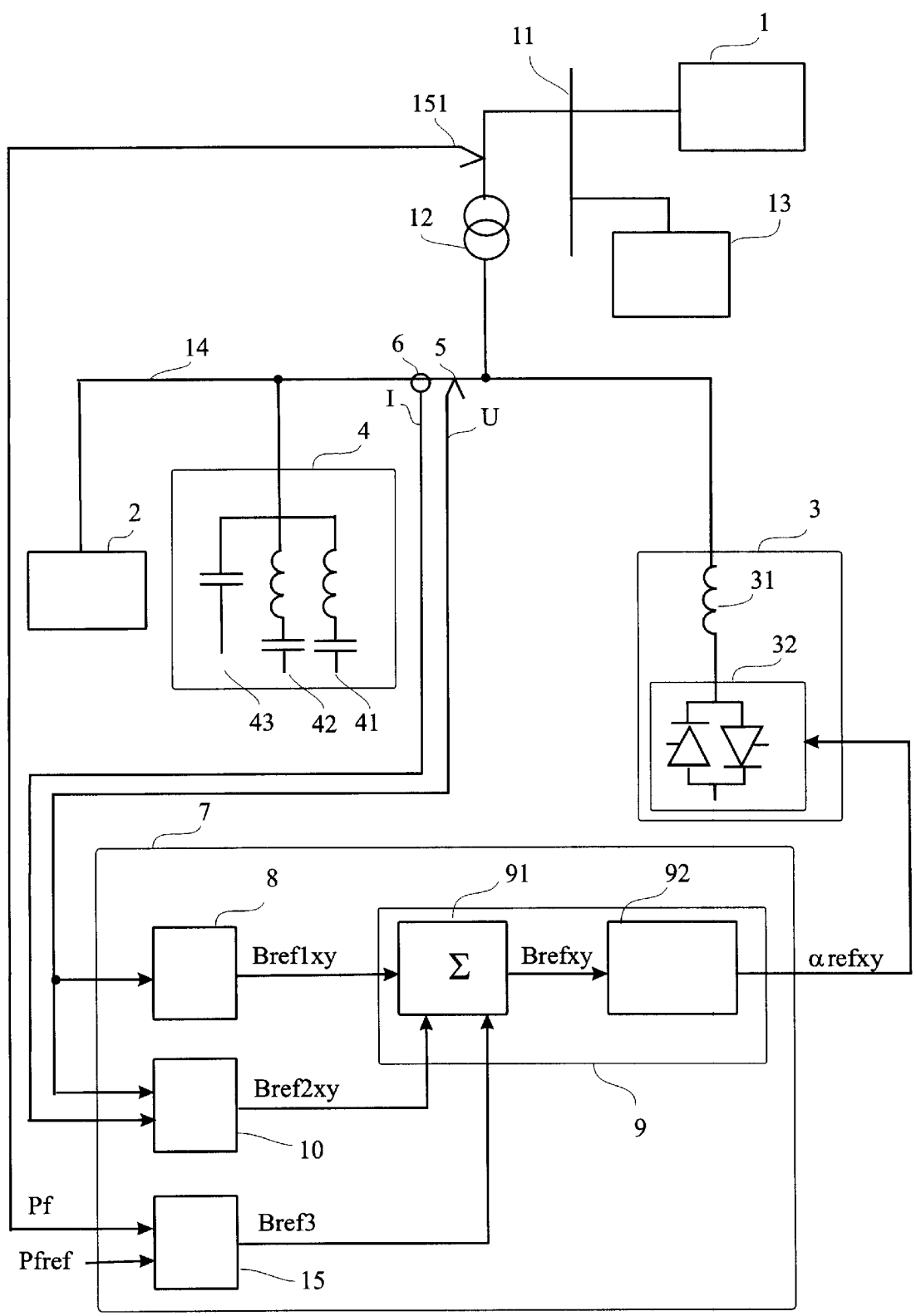

The device shown in FIG. 1B differs from the device described above, and shown in FIG. 1A, only as regards the measurement of current. The device described with reference to FIG. 1A measures the current that is consumed by the industrial load. The device shown in FIG. 1B measures the current that is consumed jointly by the industrial load and the second compensation device. The second reference value Bref2xy for the susceptance of the first compensation device is formed in a manner known per se in dependence on the reactive power consumption of the industrial load, that is, in this embodiment the arc furnace. As shown in FIG. 1, the values of currents and voltages are sensed with the voltage-measuring device 5 and the current-measuring device 6 and are supplied to the calculating member 10. The calculating member 10 forms, in dependence on sensed voltages and currents, in some manner known per se, the calculated values of active and reactive power based on the following known equations for transformation from a three-phase system, the phases of which are designated a, b, c, to an orthogonal two-phase system, the phases of which are designated d and q.

$$U_d+jU_q=\bar{U}=2/3[U_a+U_b*e^{j2\pi/3}+U_c*e^{-j2\pi/3}] \quad (2)$$

$$I_d+jI_q=\bar{I}=2/3[I_a+I_b*e^{j2\pi/3}+I_c*e^{-j2\pi/3}] \quad (3)$$

$$Q(t)=3/2Im[\bar{U}*\bar{I}*]=3/2[U_d*I_q-U_q*I_d] \quad (4)$$

$$P(t)=3/2Re[\bar{U}*\bar{I}]=3/2[U_d*I_d+U_q*I_q] \quad (5)$$

where $\bar{I}*$ designates the conjugate of the current vector $\bar{I}$ and Re and Im designate the real part and the imaginary part, respectively, of the complex apparent power $[\bar{U}*\bar{I}*]$.

Between the power $Q_r$ consumed by the thyristor-controlled reactor and the susceptance B thereof, the following relationship prevails:

$$Q_r=-3/2*B*|\bar{U}| \quad (6)$$

where $|\bar{U}|$ designates the magnitude of the voltage vector $\bar{U}=U_d+jU_q$.

The controller 15 forms, also in a manner known per se, in dependence on the difference of a power factor sensed for the plant and a reference value therefor, a third reference value Bref3. This reference value Bref3 is equal for each phase. The second and third reference values are supplied, together with the first reference value Bref1xy, to the summing member 91, the output signal Brefxy of which constitutes a susceptance reference for the susceptance of the first compensation device.

As illustrated in FIG. 1A, the power factor Pf for the transformer, the load and the compensation device is sensed in some manner known per se by means of a measuring member 151 on the primary side of the transformer 12 and is supplied to the controller 15. As mentioned above, the controller forms the second control signal Bref3 in dependence on a comparison between the sensed value of the power factor and for a prescribed reference value Pfref. The aim of the controller 15 is to maintain an average power factor, for the connected equipment, in accordance with an agreement with the power supplier. This mean value is usually specified over periods of 10–30 minutes, and this controller is thus active in a considerably lower frequency range than those parts of the control equipment 7 which consist of the first calculating member 10 and the preferred embodiment of the invention according to the above.

The invention is not limited to the embodiments shown; the person skilled in the art may, of course, modify it in a plurality of ways within the scope of the invention as defined by the claims. Thus, for example, the calculating member 81 may be supplied with sensed values of the peak values or the mean values of the voltages, in which case the voltage mean value is formed as a mean value of these amplitude values. Further, the invention may, of course, be applied also to the case where the first compensation device comprises thyristor-controlled reactors in Y-connection.

Figure 3:
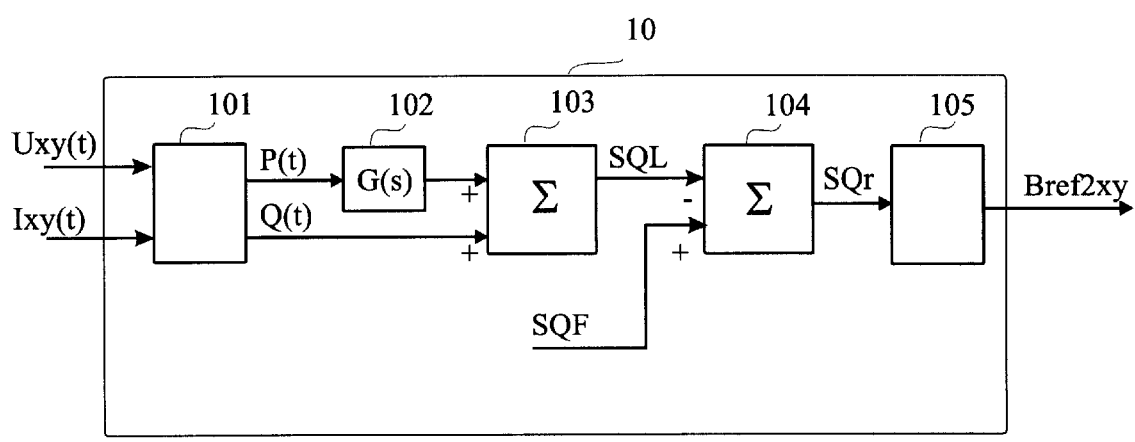
FIG. 3 shows a known embodiment of a calculating member in a piece of control equipment according to FIGS. 1A and 1B.

The calculating member 10 may also be designed as illustrated in FIG. 3, comprising a calculating member 101, a filter member 102 with band-pass characteristic, two summators 103, 104 and a quotient-forming member 105.

In this embodiment, the calculating member 101 calculates, in a manner known per se, both the instantaneously consumed active power of the arc furnace and the instantaneously consumed reactive power of the arc furnace, for example via transformation of sensed voltages and currents into an orthogonal two-phase system as described in EP 0 847 612. The calculated value of the instantaneously consumed active power is supplied to a filter member 102, the transfer function G(s) of which makes the function member effective in the frequency interval effective for reduction of flicker. The output signal of the function member and the calculated value for the consumed reactive power are supplied to a summator 103 which, in a manner known per se, in dependence on these values, forms a sum SQL. The summator 104 is supplied with the sum SQL and, with inversed sign, a signal SQF which represents the reactive power generated by the second compensation device. The output signal SQr from the summator 104 thus consists of a difference of the supplied signals and constitutes a calculated value of the reactive power which is to be consumed by the first compensation device. The quotient-forming member 105 is supplied with the output signal SQr and forms, in a manner known per se, the second reference value Bref 2xy.

What is claimed is:

1. A method for compensation of the compensating a reactive power consumption of an industrial load, supplied from a three-phase electric AC network including a first compensation device for controllable consumption of reactive power and a second compensation device for generation of reactive power, both of said first and second compensation devices being connected to the AC network in a parallel connection with the industrial load, the first compensation device comprising a thyristor-controlled reactor for each of the phases of the AC network, the method comprising:

sensing an amplitude value for a voltage for each of the thyristor-controlled reactors, said voltage representing a voltage across a respective thyristor-controlled reactor;

forming a voltage mean value as a mean value of said amplitude values;

forming an amplitude deviation for each of the thyristor-controlled reactors as a difference of the voltage mean value and the amplitude value associated with the respective thyristor-controlled reactor;

forming a separate control order for phase-angle control of each of the thyristor-controlled reactors, said control order being dependent on the amplitude deviation for the respective thyristor-controlled reactor; and determining an instantaneous consumption of reactive power by the industrial load, said control order being further dependent on the instantaneous consumption of reactive power by the industrial load.

2. The method according to claim 1, wherein the thyristor-controlled reactors are mutually connected in a Δ-connection.

3. The method according to claim 1, wherein the respective control order is also formed in dependence on the instantaneous consumption of active power by the load.

4. A method for compensating a reactive power consumption of an industrial load, supplied from a three-phase electric AC network including a first compensation device for controllable consumption of reactive power and a second compensation device for generation of reactive power, both of said first and second compensation devices being connected to the AC network in a parallel connection with the industrial load, the first compensation device comprising a thyristor-controlled reactor for each of the phases of the AC network, the method comprising:

sensing an amplitude value for a voltage for each of the thyristor-controlled reactors, said voltage representing a voltage across a respective thyristor-controlled reactor;

forming a voltage mean value as a mean value of said amplitude values;

forming an amplitude deviation for each of the thyristor-controlled reactors as a difference of the voltage mean value and the amplitude value associated with the respective thyristor-controlled reactor;

forming a separate control order for phase-angle control of each of the thyristor-controlled reactors, said control order being dependent on the amplitude deviation for the respective thyristor-controlled reactor; and determining a total consumption of reactive power by the industrial load and the second compensation device, said control order being further dependent on the total consumption of reactive power by the industrial load and the second compensation device.

5. The method according to claim 4, wherein the thyristor-controlled reactors are mutually connected in a Δ-connection.

6. The method according to claim 4, wherein the respective control order is also formed in dependence else on the instantaneous consumption of active power by the load and the second compensation device.

7. A device for compensating a reactive power consumption of an industrial load, supplied from a three-phase electric AC network, said device comprising:

a first compensation device for controllable consumption of reactive power;

a second compensation device for generation of reactive power, both of said first and second compensation devices being connected to the AC network in a parallel connection with the industrial load, the first compensation device including a thyristor-controlled reactor for each of the phases of the AC network;

voltage-measuring devices for each of the thyristor-controlled reactors and for sensing of amplitude values for a voltage which represents a voltage across a respective thyristor-controlled reactor;

current-measuring devices for each of the thyristor-controlled reactors for sensing of the respective current at the industrial load;

control equipment for each of the thyristor-controlled reactors, which is supplied with measured values of the sensed amplitude values for voltages and currents, the control equipment including means for determining an instantaneous consumption of reactive power by the industrial load; and a control device for each of the thyristor-controlled reactors which forms a control order dependent on the sensed amplitude values for voltages and currents for the thyristor-controlled reactors and supplies the control order to the respective thyristor-controlled reactor, the control equipment including, means for forming a voltage mean value as the a mean value of said amplitude values for voltage, means for forming, for each of the thyristor-controlled reactors, an amplitude deviation as a difference of the voltage mean value and the amplitude value associated with the thyristor-controlled reactor, and means for forming, for each of the thyristor-controlled reactors, a separate control order in dependence on the amplitude deviation for the respective thyristor-controlled reactor.

8. The device according to claim 7, wherein the thyristor-controlled reactors are mutually connected in a Δ-connection.

9. The device according to claim 7, wherein the control equipment includes means for determining the instantaneous consumption of active power by the industrial load, and means for forming the respective control order dependent on the instantaneous consumption of active power by the industrial load.

10. A device for the compensating a reactive power consumption of an industrial load, supplied from a three-phase electric AC network, said first and second device comprising:

a first compensation device for controllable consumption of reactive power;

a second compensation device for generation of reactive power, both of said compensation devices being connected to the AC network in a parallel connection with the industrial load, the first compensation device including a thyristor-controlled reactor for each of the phases of the AC network;

voltage-measuring devices for each of the thyristor-controlled reactors and for sensing of amplitude values for a voltage which represents a voltage across a respective thyristor-controlled reactor;

current-measuring devices for each of the thyristor-controlled reactors for sensing currents flowing to the parallel connection that is constituted by the industrial load and the second compensation device; and control equipment for each of the thyristor-controlled reactors, which is supplied with measured values of the sensed amplitude values for voltages and currents, the control equipment including means for determining a total consumption of reactive power by the industrial load and the second compensation device; and a control device for each of the thyristor-controlled reactors which forms a control order dependent on the sensed amplitude values for voltages and currents for the thyristor-controlled reactors and supplies the control order to the respective thyristor-controlled reactor, the control equipment including, means for forming a voltage mean value as the a mean value of said amplitude values for voltage, means for forming, for each of the thyristor-controlled reactors, an amplitude deviation as a difference of the voltage mean value and the amplitude value associated with the thyristor-controlled reactor, and means for forming, for each of the thyristor-controlled reactors, a separate control order in dependence on the amplitude deviation for the respective thyristor-controlled reactor.

11. The device according to claim 10, wherein the thyristor-controlled reactors are mutually connected in a Δ-connection.

12. A The device according to claim 10, wherein the control equipment includes means for determining the instantaneous consumption of active power by the industrial load and the second compensation device, and means for forming the respective control order dependent on the instantaneous consumption of active power by the industrial load and the second compensation device.

13. The method according to claim 1, wherein the industrial load includes one of an electric arc furnace and a plant for rolling metallic materials.

14. The method according to claim 4, wherein the industrial load includes one of an electric arc furnace and a plant for rolling metallic materials.

15. The device according to claim 7, wherein the industrial load includes one of an electric arc furnace and a plant for rolling metallic materials.

16. The device according to claim 10, wherein the industrial load includes one of an electric arc furnace and a plant for rolling metallic materials.

17. A device for compensating a reactive power consumption of an industrial load, supplied from a three-phase electric AC network, said device comprising:
a first compensation device configured to control consumption of reactive power;
a second compensation device configured to generate reactive power, both of said first and second compensation devices being connected to the AC network in a parallel connection with the industrial load, the first compensation device including a thyristor-controlled reactor for each of the phases of the AC network;
voltage-measuring devices for each of the thyristor-controlled reactors and configured to sense amplitude values for a voltage which represents a voltage across a respective thyristor-controlled reactor;
current-measuring devices for each of the thyristor-controlled reactors and configured to sense the respective current at the industrial load;
control equipment for each of the thyristor-controlled reactors which is supplied with measured values of the sensed amplitude values for voltages and currents, the control equipment configured to determine the instantaneous consumption of reactive power by the load; and
a control device for each of the thyristor-controlled reactors and configured to form a control order dependent on the sensed amplitude values for voltages and currents for the thyristor-controlled reactors and to supply the control order to the thyristor-controlled reactors, the control equipment including,
a voltage mean value forming device configured to form a voltage mean value as a mean value of said amplitude values for voltage,
an amplitude deviation forming device configured to form, for each of the thyristor-controlled reactors, an amplitude deviation as a difference of the voltage mean value and the amplitude value associated with the thyristor-controlled reactor, and
a control order forming device for each of the thyristor-controlled reactors and configured to form a separate control order dependent on the amplitude deviation for the respective thyristor-controlled reactor.

18. The device according to claim 17, wherein the thyristor-controlled reactors are mutually connected in a Δ-connection.

19. The device according to claim 17, wherein the control equipment is configured to determine the instantaneous consumption of active power by the industrial load, and configured to form the respective control order dependent on the instantaneous consumption of active power by the industrial load.

20. A device for compensating a reactive power consumption of an industrial load, supplied from a three-phase electric AC network, said device comprising:
a first compensation device configured to control consumption of reactive power;
a second compensation device configured to generate reactive power, both of said first and second compensation devices being connected to the AC network in a parallel connection with the industrial load, the first compensation device including a thyristor-controlled reactor for each of the phases of the AC network;
voltage-measuring devices for each of the thyristor-controlled reactors and configured to sense amplitude values for a voltage which represents a voltage across a respective thyristor-controlled reactor;
current-measuring devices for each of the thyristor-controlled reactors and configured to sense currents flowing to the parallel connection that is constituted by the industrial load and the second compensation device;
control equipment for each of the thyristor-controlled reactors which is supplied with measured values of the sensed amplitude values for voltages and currents, and the control equipment is configured to determine the total consumption of reactive power by the load and the second compensation device; and
a control device for each of the thyristor-controlled reactors and configured to form a control order dependent on the sensed amplitude values for voltages and currents for the thyristor-controlled reactors and to supply the control order to the thyristor-controlled reactors, the control equipment including,
a voltage mean value forming device configured to form a voltage mean value as a mean value of said amplitude values for voltage,
an amplitude deviation forming device configured to form, for each of the thyristor-controlled reactors, an amplitude deviation as a difference of the voltage mean value and the amplitude value associated with the thyristor-controlled reactor, and
a control order forming device for each of the thyristor-controlled reactors and configured to form a separate control order dependent on the amplitude deviation for the respective thyristor-controlled reactors.

21. The device according to claim 10, wherein the thyristor-controlled reactors are mutually connected in a Δ-connection.

22. The device according to claim 20, wherein the control equipment is configured to determine the instantaneous consumption of active power by the industrial load and the second compensation device, and configured to form the respective control order dependent on the instantaneous consumption of active power by the industrial load.

* * * * *

UNITED STATES PATENT AND TRADEMARK OFFICE
CERTIFICATE OF CORRECTION

PATENT NO. : 6,674,267 B2
DATED : January 6, 2004
INVENTOR(S) : Lennart Wernersson It is certified that error appears in the above-identified patent and that said Letters Patent is hereby corrected as shown below:

Column 5,
Line 47, change "Bref2y" to -- Bref2xy --;
Line 47, change, "Bref3" to -- Bref3xy --.

Column 7,
Line 27, change "$U_d+j_q=$" to -- $U_d+jU_q=$ --.
Line 28, change "$I_d+j_q=$" to -- $I_d +jI_q=$ --.
Line 29, change "= 3/2" to -- = -3/2 --.

Column 8,
Line 42, delete "compensation of the".

Column 9,
Line 43, delete "else".

Column 10,
Lines 10 and 29, delete "the".

Signed and Sealed this

Twenty-ninth Day of June, 2004

JON W. DUDAS
*Acting Director of the United States Patent and Trademark Office*